D. SMITH.

REVOLVING FIRE ARM.

No. 9,965. Reissued Dec. 13, 1881.

Witnesses
J. D. Garfield
G. N. Bowers

Inventor
Dexter Smith
by Henry A. Chapin
Atty

N. PETERS. Photo-Lithographer. Washington, D. C.

UNITED STATES PATENT OFFICE.

DEXTER SMITH, OF SPRINGFIELD, MASSACHUSETTS.

REVOLVING FIRE-ARM.

SPECIFICATION forming part of Reissued Letters Patent No. 9,965, dated December 13, 1881.

Original No. 247,218, dated September 20, 1881. Application for reissue filed October 8, 1881.

*To all whom it may concern:*

Be it known that I, DEXTER SMITH, a citizen of the United States, residing at Springfield, in the county of Hampden and State of Massachusetts, have invented new and useful Improvements in Revolving Fire-Arms, of which the following is a specification.

This invention relates to improvements in the construction of revolving fire-arms, and more particularly to improved mechanism for securing the cylinder in the arm and for operating the extractor devices, the object being to secure great convenience of manipulation and a serviceable construction by the employment of fewer parts than are usually required in the class of arms herein described, and a consequent economical result as to cost of production.

Figure 1:
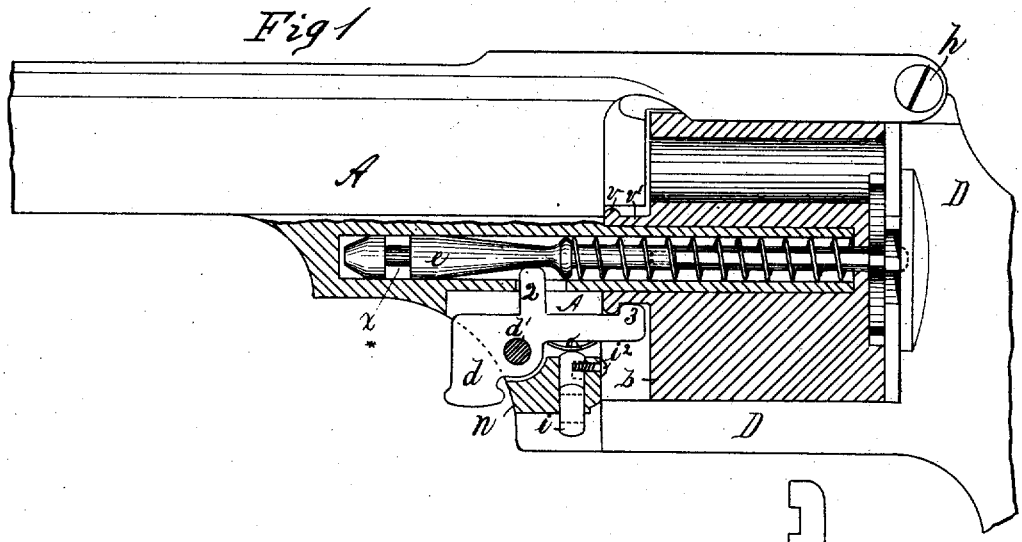
Figure 2:
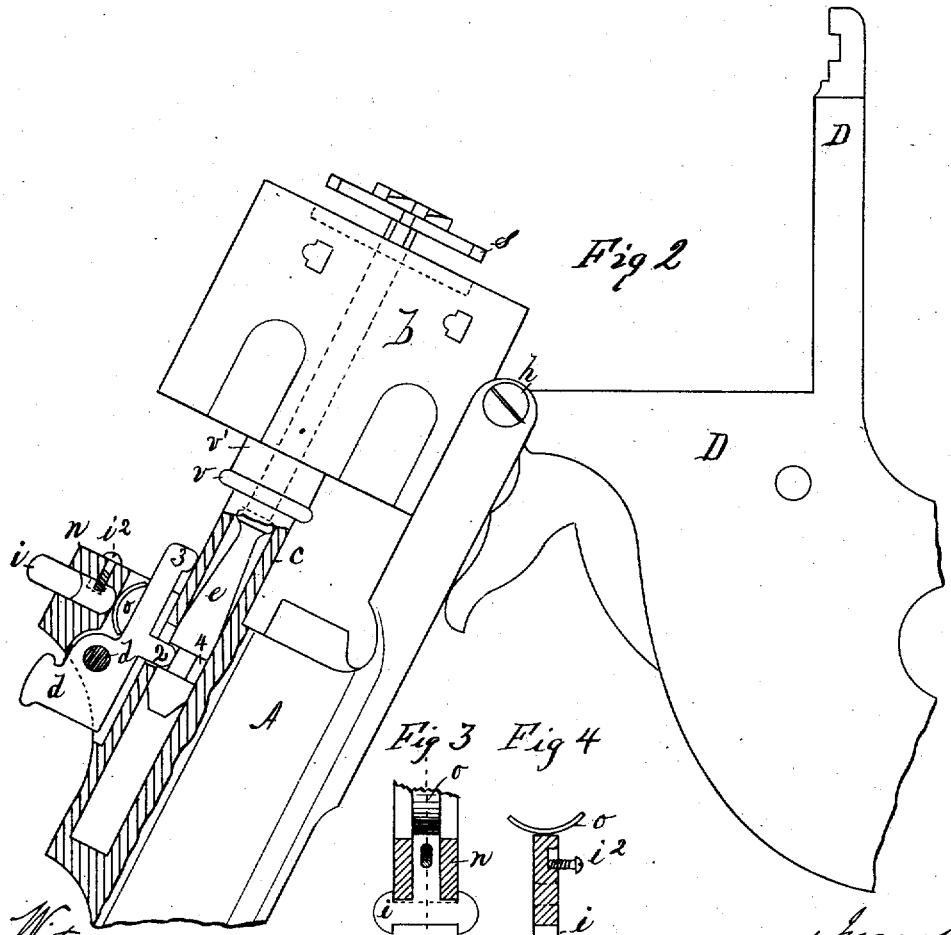
Figures 3, 4:
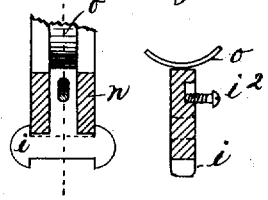

In the drawings forming part of this specification, Figure 1 is a side elevation, partly in section, of the central portion of a revolving pistol constructed according to my invention. Fig. 2 is a side elevation, partly in section, of the parts shown in Fig. 1, representing their position when shells are being extracted from the cylinder after firing. Figs. 3 and 4 are detail parts.

In the drawings, A is the barrel of the arm. D is the frame. *b* is the cylinder. *c* is the base-pin. *e* is the extractor-stem. *f* is the extractor-spring. *s* is the extractor. *d* is a combined extractor and cylinder-catch. *v* is a catch-collar on the neck of cylinder *b*. *i* is a barrel-catch. *o* is a cylinder and barrel-catch spring.

In the arm herein described the barrel and frame are hinged together at *h*, above and in the rear of the cylinder, and in a downhanging boss, *n*, under the bore of the barrel and directly in front of the cylinder, is placed a vertically-operating barrel-catch, of ordinary construction, whose lower end is driven by spring *o* into a transverse groove on the arm of frame D, which reaches forward under the cylinder. A stop-screw, $i^2$, in the boss *n* keeps said catch in its socket in said boss *n*. The details of the construction of said catch and spring *o* and their relation to each other are shown in Figs. 3 and 4, and their general relation to frame D and said boss *n* in Figs. 1 and 2.

The hollow base-pin *c* extends rearward from the boss *n* under the barrel, and a cylindrical cavity is made in a line through said base-pin and into said boss for the reception therein of the extractor-stem *e* and the extractor-spring *f*, which surrounds said stem.

In the arm herein shown the extractor *s* is of the ordinary construction and form, as is also that part of the extractor-stem *e* within the cylinder and directly attached to said extractor; but that part of said stem which extends beyond the front end of the cylinder into the base-pin cavity is of novel construction to adapt it to the improvements herein described. It will be seen that a shoulder is formed on said extractor-stem, just forward of the end of the cylinder, against which the end of spring *f* rests, its opposite end pressing against the extractor-stem chamber in the cylinder *b*. The extractor-stem forward of said collar is made tapering, being smaller near the collar, and beyond said tapering part an annular groove, *x*, is formed around it, and its end beyond said groove is tapered, as shown. A neck, *v'*, is formed on the forward end of cylinder *b*, around the entrance to said chamber therein, and around the end of said neck is formed a half-round collar, *v*.

The boss *n* under the barrel is chambered longitudinally to receive therein the catch *d*, which is a combined extractor and cylinder-catch, and said catch is pivoted in said chamber by the pin *d'*. Catch *d* has on its outer end a thumb-piece, and on its upper side two arms, 2 and 3, the ends of which are rounded, as shown.

Spring *o* is a simple half-elliptic spring, which lies between the under side of catch *d* and the upper end of the barrel-catch *i*, and serves to operate both of these elements in opposite directions.

The operation of my improvements is as follows, it being understood that the position of the parts of the arm after having been fired is that shown in Fig. 1: To open the "arm," as it is termed, and to operate the extractor, the arm is turned to bring the barrel to the position shown in Fig. 2. Catch *i* is pressed down against spring *o* to disengage it from the notch on frame D, and that part of said frame in the rear of the cylinder is swung over on its hinge at *h* to the position shown in said figure. The cylinder is now drawn up, collar *v* on neck *v'* of the cylinder slipping over the end of arm 3 on catch *d*, pulling the tapered part of the extractor-stem across the end of arm 2 on said catch, forcing the latter down against spring *o* until the groove *x* on said stem reaches said arm 2, when the end of the latter will engage with said groove and prevent said stem from being drawn farther out. The cylinder is now moved in the opposite direction, sliding on the base-pin *c* and drawing said cylinder away from the extractor *s*, stem *e* being held by catch *d*, as shown in Fig. 2, thus extracting the shells from the cylinder and compressing spring *f* around the stem *e*, and when collar *v* on neck *v'* of said cylinder strikes the end of arm 3 on catch *d* it swings the latter, drawing arm 2 out of groove *x* in stem *e*, and spring *f* drives said stem forward again to the position shown in Fig. 1, the cylinder thus becoming automatically secured again upon the base-pin as collar *v* slides past the end of arm 3 on catch *d*, and may now be reloaded and the frame closed ready for firing again.

When it is desired to remove the cylinder and extractor-stem entirely from the arm the outer end of catch *d* is pressed up toward the barrel, the arm being open, as in Fig. 2, when said stem may be drawn unobstructedly away from the base-pin cavity.

The stem *e* may be replaced in the base-pin without operating catch *d*, for the tapered end of said stem will, as it encounters the end of arm 2 thereon, force it back out of the way, and collar *v* following against the end of arm 3, nothing obstructs the entrance of said stem and the cylinder up to the position shown in Fig. 1.

What I claim as my invention is—

1. The combination, in a revolving fire-arm, of the cylinder *b*, having the neck *v'* at the mouth of its extractor-stem chamber provided with the collar *v* around its end, of the extractor-stem provided with the annular groove *x*, of the extractor-spring *f*, and of the catch *d*, automatically operating to retain said cylinder upon its base-pin and the extractor-stem within the latter, substantially as set forth.

2. In combination, the cylinder *b*, having the neck *v'*, provided with the collar *v*, the extractor-stem *e*, having the annular groove *x*, the extractor-spring *f*, and catch *d*, provided with arms 2 and 3, which engage alternately with said stem *e* and with said neck *v'*, substantially as set forth.

3. The combination, with the extractor-stem *e*, having its end and its body of tapering form, and having the annular groove *x* therein, of the catch *d*, provided with arm 2, and spring *o*, substantially as set forth.

4. The combination, with the cylinder *b*, having the neck *v'*, provided with the single collar *v*, of the vertically-moving catch *d*, provided with the arm 3, to engage with said collar, and spring *o*, substantially as set forth.

5. The combination, in a revolving fire-arm, of a hollow base-pin, *c*, of a cylinder having the neck *v'*, provided with the collar *v*, of the extractor-stem *e*, having the annular groove *x*, the catch *d*, having the arms 2 and 3 thereon, the extractor-spring *f*, and the spring *o*, substantially as set forth.

6. In combination with the barrel A, having the hollow base-pin *c*, upon which the cylinder revolves and moves back and forth, the catch *d*, spring *o*, the extractor-stem *e*, with the groove *x* therein, the extractor-spring *f* within the cylinder, and the cylinder *b*, having thereon the neck *v'*, whereby the empty shells are extracted, the said catch is thrown out of connection with the extractor-stem, and the extractor is returned to its normal position against the cylinder by the rearward and forward movement of the cylinder on said base-pin, substantially as set forth.

DEXTER SMITH.

Witnesses:
H. A. CHAPIN,
J. D. GARFIELD.